United States Patent Office 2,850,440
Patented Sept. 2, 1958

2,850,440

PURIFICATION OF PHTHALIC ANHYDRIDE BY DISTILLATION

Marvin O. Shrader and Harold L. Dimond, Pittsburgh, Pa., assignors to Pittsburgh Coke & Chemical Company, Pittsburgh, Pa., a corporation of Pennsylvania No Drawing. Application September 7, 1955
Serial No. 533,014

13 Claims. (Cl. 202—57)

The present invention relates to the purification of phthalic anhydride to improve its color and color stability and, more particularly, to the purification of crude phthalic anhydride containing $\alpha$-naphthoquinone and related bodies which are colored or form colored compounds.

Phthalic anhydride has many uses which require it to be substantially free of color and bodies which develop color upon heating. Among such uses are the manufacture of light-colored resins, e. g., glyceryl phthalate and diallyl phthalate type resins; plasticizers, e. g., butyl decyl phthalate and dioctyl phthalate, etc.

Phthalic anhydride is conventionally prepared today by the catalytic oxidation of naphthalene vapors. Crude phthalic anhydride thus obtained usually contains relatively small amounts of impurities, such as naphthoquinones, especially, $\alpha$-naphthoquinone, and other color-forming impurities. Conventionally, phthalic anhydride is purified by heating it at reflux for a considerable period of time to polymerize or otherwise decompose the impurities which would, otherwise, co-distill with the phthalic anhydride and give a colored product, or one which becomes colored upon heating. This conventional heat treatment, however, does not remove all of the undesired naphthoquinone and other color-forming bodies.

An object of the present invention is to provide a simple, efficient, and economical method for purifying crude phthalic anhydride.

Another object of the invention is to provide a simple chemical purification treatment of crude phthalic anhydride which has been prepared by the vapor phase catalytic oxidation of naphthalene, whereby a purified phthalic anhydride of low color and of excellent heat color stability is obtained.

A further object of the invention is to provide an improved for purifying crude phthalic anhydride which contains impurities of the type of $\alpha$-naphthoquinone.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

To be successful in aiding in the purification of phthalic anhydride, a chemical reagent must tie up the color bodies (whose chemical nature is not completely understood); it must remove or destroy substantially all of the $\alpha$-naphthoquinone present; it must dissolve in molten phthalic anhydride or remain suspended, so as not to plug the system; it must be non-volatile at temperatures up to and beyond the boiling point of phthalic anhydride; preferably, it should be capable of reducing the 18 hours of heat-treating time normally required in the commercial purification of phthalic anhydride; it must be inexpensive, readily available, preferably non-toxic in the amounts employed, non-corrosive and effective in small concentrations.

It has now been found that the above-mentioned objects can be accomplished by heating the crude phthalic anhydride with a minor amount of boric acid, preferably, in the presence of a small amount of sulfuric acid, to react with the color-forming impurities present to change them to a removable form, and, thereafter, recovering the purified phthalic anhydride in conventional manner, e. g., by distillation and the like.

In the present specification and claims, all proportions and percentages are by weight, unless otherwise indicated.

All references to numerical "color" values, e. g., "initial color" and "heat color," are according to the Platinum-Cobalt (Hazen) Color Standard described at page 71 of the 1939 Edition of "Physical and Chemical Examination of Paints, Varnishes, Lacquers and Colors" by Henry A. Gardner, published by the Institute of Paint and Varnish Research, Washington, D. C. It is especially desirable that the phthalic anhydride, after purification, have a "heat color" of 30 or under.

By "initial color" is meant the color of the molten phthalic anhydride immediately after distillation from the mixture containing the color-forming bodies. By "heat color" is meant the color of the molten phthalic anhydride which has been distilled from the mixture containing the color-forming bodies and then has been subjected to a temperature of 250° C. for 1.5 hours. The "heat color" test is also indicative of heat stability. The lower the color number, in general, the better is the heat stability of the phthalic anhydride.

The crude phthalic anhydride, either with or without a preliminary distillation, is mixed with the boric acid (with or without sulfuric acid) and the mixture is heated at any temperature above the melting point of the phthalic anhydride to the reflux temperature. At atmospheric pressure, this is a range of from about 127° C. to 284° C. The treatment can be carried out at subatmospheric or superatmospheric pressure but, preferably, atmospheric pressure is employed. The heat treatment is continued until substantial improvement in the heat color test is obtained. Usually, a time of 4 to 22 hours, preferably 6 to 18 hours is used. A time of 12 to 16 hours has proven especially satisfactory. Based on the phthalic anhydride, when boric acid is used alone to improve the color, it is present in an amount as low as 0.05%, or even lower, to 20% or even higher. Generally, no advantage is obtained from the use of such excessively large amounts of boric acid to compensate for the increased cost and it has been found preferable to employ 0.1 to 1% of the boric acid. Outstanding results are obtained at the lower end of the preferred range and, hence, the use of about 0.1% of boric acid is especially preferred.

As previously stated, the addition of sulfuric acid along with the boric acid even further improves the heat color of the phthalic anhydride. Apparently, there is some type of synergistic effect involved, as sulfuric acid is considerably inferior to boric acid in improving the heat color of phthalic anhydride, yet, the mixture of sulfuric acid and boric acid is considerably superior to the use of boric acid alone. Additionally, these improved results are obtained while using less boric acid than is required for the same effect when the boric acid is used alone. The range of proportions, based on the phthalic anhydride, of the total of the boric acid and the sulfuric acid, in this form of the invention is the same as for the boric acid alone in the first form of the invention; e. g., preferably, the total of the boric acid and sulfuric acid is from 0.1% to 1% of the phthalic anhydride. The sulfuric acid can be employed in any amount up to 75% of the total of the boric acid and sulfuric acid. Generally, there is not a significant improvement over the use of boric acid alone in the use of less than 25% of sulfuric acid. Preferably, the boric acid and sulfuric acid are used in approximately equal amounts, e. g., 0.05 part of boric acid and 0.05 part of sulfuric acid per 100 parts of phthalic anhydride. The concentration of the sulfuric acid is not especially critical, but usually is between 80% and 100%.

While the phthalic anhydride after the boric acid treatment (with or without sulfuric acid) can be distilled through a distillation column, packed in any conventional manner, e. g., with protruding stainless steel, it frequently has been found preferable to pack a portion of the distillation column, e. g., the lower third thereof, with some form of iron capable of being attacked. Typical examples of such materials are No. 3 coarse steel (iron) wool, mossy iron, iron spheres, shredded iron, iron wire, powdered iron, screen or coiled iron, iron saddles, iron rings, iron baskets, etc.

In the following examples, the samples were heat treated in a one-liter, three-neck, ground-glass flask, placed in an air bath. The samples were maintained at 285° C. (reflux temperature) for the times indicated and the air bath was maintained at a temperature between about 285° C. and 300° C. The final product was obtained by distillation through a 23-inch column, packed with 0.16 x 0.16 stainless steel, protruded packing, unless otherwise noted.

In the examples, a forecut of about 20% was taken during each run followed by three heart cuts of approximately 20% each and initial and heat colors were taken on each of these four cuts in the manner previously set forth. No initial or heat color were taken on the residue in the flask (about 20% of the crude phthalic anhydride). The phthalic anhydride employed in the examples was prepared by the catalytic oxidation of naphthalene and was in the crude form, except in those examples where it is indicated that the crude phthalic anhydride was first partially purified by a simple distillation prior to the heat treatment with the chemical reagent.

We claim:

1. A process for the purification of crude phthalic anhydride containing color-forming impurities which comprises heating the crude phthalic anhydride in the molten state in the presence of boric acid and thereafter recovering the purified phthalic anhydride of improved heat color.

2. A process according to claim 1, wherein the boric acid is added in an amount of from about 0.05 to 1% based on the weight of the phthalic anhydride.

3. A process according to claim 2, wherein the heating is continued for about 6 to 18 hours.

4. A process according to claim 1, in which there is also present during the heating step sulfuric acid in an amount up to three times the amount of boric acid by weight.

5. A process according to claim 4, wherein the total of the boric acid and sulfuric acid is about 0.1% to 1% based on the weight of the phthalic anhydride and the heating is continued for about 6 to 18 hours.

6. A process according to claim 1, wherein the phthalic anhydride is recovered by distillation through a column at least partially packed with iron.

7. A process for the purification of crude phthalic anhydride containing color-forming impurities which comprises heating the crude phthalic anhydride in the molten state in the presence of a member of the group consisting of boric oxide and boric acid and thereafter recovering the purified phthalic anhydride of improved heat color.

8. A process for the purification of crude phthalic anhydride containing color-forming impurities comprising heating the crude phthalic anhydride in the molten state in the presence of about 0.05% to 20% of boric acid and thereafter recovering the purified phthalic anhydride.

9. A process according to claim 8, wherein the phthalic anhydride is recovered by distillation through a column at least partially packed with iron.

10. A process according to claim 8 in which there is also present during the heating step sulfuric acid in amount of 25 to 75% based on the total weight of the sulfuric acid and boric acid.

11. A process for the purification of crude phthalic

| Ex. | Reagent and amount based on the phthalic anhydride | Forecut initial color | Heat cuts | | | | | | Time of refluxing, hours | Weight of phthalic anhydride, grams | Comments |
|---|---|---|---|---|---|---|---|---|---|---|---|
| | | | Cut No. 1 | | Cut No. 2 | | Cut No. 3 | | | | |
| | | | Initial color | Heat color | Initial color | Heat color | Initial color | Heat color | | | |
| 1 | No reagent | 25 | 20 | 140 | 20 | 110 | 20 | 110 | 6 | 327.4 | Partially purified by simple distillation. |
| 2 | do | 20 | 20 | 55 | 15 | 70 | 15 | 50 | 9 | 409.7 | Positive naphthoquinone. |
| 3 | do | 60 | 20 | 65 | 20 | 200 | 15 | 95 | 12 | 483.7 | Do. |
| 4 | do | 110 | 40 | 225 | 20 | 95 | 10 | 45 | 18 | 350 | Do. |
| 5 | 1% H₂SO₄ (96% conc.) | 35 | 20 | 85 | 40 | 100 | 15 | | 6 | 252 | Melting point 130.05° C.; partially purified by simple distillation. |
| 6 | do | 20 | 40 | 200 | 40 | 150 | 5 | 25 | 9 | 220.8 | Positive naphthoquinone; partially purified by simple distillation. |
| 7 | do | Blank | 90 | 350 | 20 | 60 | 15 | 50 | 12 | 291 | Do. |
| 8 | 1% B₂O₃ | 15 | 15 | | 5 | 25 | 10 | | 6 | 331.7 | Slightly positive naphthoquinone; partially purified by simple distillation. |
| 9 | ¼% B₂O₃ | 25 | 15 | 30 | 15 | 25 | 15 | 20 | 6 | 325.1 | Positive naphthoquinone. |
| 10 | ¼% H₃BO₃ | 15 | 15 | 35 | 20 | 35 | 15 | 25 | 9 | 326.5 | Slightly positive naphthoquinone. |
| 11 | 0.1% H₃BO₃ | 70 | 25 | 60 | 15 | 30 | 15 | 35 | 9 | 343.7 | Negative naphthoquinone. |
| 12 | do | 25 | 10 | 25 | 10 | 30 | 10 | 25 | 12 | 401.2 | Do. |
| 13 | do | 30 | 15 | 50 | 20 | 60 | 15 | 30 | 18 | 351.3 | Do. |
| 14 | do | 20 | 20 | 25 | 10 | 15 | 10 | 15 | 18 | 397.5 | Negative naphthoquinone; middle 3rd of distilling column packed with No. 3 steel wool. |
| 15 | 0.05% H₃BO₃ and 0.05% H₂SO₄ (96% conc.) | 20 | 20 | 30 | 15 | 25 | 15 | 25 | 9 | 335.3 | Negative naphthoquinone. |
| 16 | do | | 10 | 30 | 15 | 15 | 10 | 15 | 12 | 317.8 | Do. |
| 17 | do | 15 | 10 | 25 | 10 | 30 | 10 | 20 | 18 | 313 | Do. |
| 18 | do | 20 | 10 | 20 | 10 | 30 | 10 | 30 | 18 | 406 | Negative naphthoquinone; lower 3rd of column packed with No. 3 coarse steel wool. |

In place of boric acid ($H_3BO_3$), there can also be used boric oxide ($B_2O_3$) which has the same chemical effect.

anhydride containing color-forming impurities which comprises heating the crude phthalic anhydride in the molten state in the presence of a mixture of substantially equal amounts of boric acid and sulfuric acid by weight, the total of the boric acid and sulfuric acid being about 0.1 to 1% based on the weight of the phthalic anhydride, continuing the heating for about 6 to 18 hours and thereafter recovering the purified phthalic anhydride.

12. A process according to claim 8 in which there is also present during the heating step sulfuric acid of a concentration between 80 and 100%, said sulfuric acid being present in an amount of 25 to 75% based on the total of the sulfuric acid and boric acid.

13. A process for the purification of crude phthalic anhydride containing color-forming impurities comprising heating the crude phthalic anhydride in the molten state in the presence of about 0.05% to 20% of a member of the group consisting of boric acid and boric oxide and thereafter recovering the purified phthalic anhydride of improved heat color.

References Cited in the file of this patent

UNITED STATES PATENTS

| | | |
|---|---|---|
| 2,050,671 | Sheffield | Aug. 11, 1936 |
| 2,091,289 | Porter | Aug. 31, 1937 |
| 2,105,911 | Foster | Jan. 18, 1938 |
| 2,510,852 | Bailey et al. | June 6, 1950 |

FOREIGN PATENTS

| | | |
|---|---|---|
| 285,017 | Great Britain | June 10, 1929 |